United States Patent
Hildinger et al.

(10) Patent No.: US 11,876,422 B2
(45) Date of Patent: Jan. 16, 2024

(54) ROTOR FOR AN ELECTRIC MACHINE

(71) Applicant: VOITH PATENT GMBH, Heidenheim (DE)

(72) Inventors: Thomas Hildinger, Santana (BR); Ludger Koedding, Heidenheim (DE); Michael Weckert, Aalen (DE); Stefan Veser, Boehmenkirch-Treffelhausen (DE); Stefan Allgeyer, Riesbuerg (DE); Holger Henning, Giengen (DE); Philipp Eilebrecht, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 470 days.

(21) Appl. No.: 17/280,978

(22) PCT Filed: Sep. 13, 2019

(86) PCT No.: PCT/EP2019/074469
§ 371 (c)(1),
(2) Date: Mar. 29, 2021

(87) PCT Pub. No.: WO2020/064364
PCT Pub. Date: Apr. 2, 2020

(65) Prior Publication Data
US 2021/0359569 A1 Nov. 18, 2021

(30) Foreign Application Priority Data
Sep. 28, 2018 (DE) .......................... 102018124011.2

(51) Int. Cl.
*H02K 3/12* (2006.01)
*H02K 3/51* (2006.01)
(Continued)

(52) U.S. Cl.
CPC ................. *H02K 3/51* (2013.01); *H02K 3/12* (2013.01); *H02K 3/38* (2013.01); *H02K 13/003* (2013.01)

(58) Field of Classification Search
CPC .. H02K 3/12; H02K 3/38; H02K 3/51; H02K 3/505
See application file for complete search history.

(56) References Cited

U.S. PATENT DOCUMENTS 3,365,600 A 1/1968 Penn
3,560,777 A * 2/1971 Moeller ................. H02K 3/505
310/270
(Continued)

FOREIGN PATENT DOCUMENTS

CN 104218715 A 12/2014
CN 204046299 U 12/2014
(Continued)

*Primary Examiner* — Dang D Le
(74) *Attorney, Agent, or Firm* — Laurence A. Greenberg; Werner H. Stemer; Ralph E. Locher

(57) ABSTRACT

A rotor for an electric machine has winding elements which are arranged in axially running grooves of a rotor body and having a winding head which is arranged axially next to the rotor body. The winding elements exit from the grooves in the axial direction in the region of the winding head and run in the axial direction in the region of the axial ends of the winding elements. Each of the winding elements has four curved portions in the region of the winding head. The rotor includes a plurality of tension bolts and a winding head carrier. The tension bolts connect the winding head to the winding head carrier and penetrate through the winding head radially.

3 Claims, 2 Drawing Sheets

(51) Int. Cl.
*H02K 3/38* (2006.01)
*H02K 13/00* (2006.01)

(56) References Cited

U.S. PATENT DOCUMENTS

| | | | |
|---|---|---|---|
| 3,601,646 A | | 8/1971 | Balke et al. |
| 5,619,088 A | * | 4/1997 | Yumiyama ............ H02K 13/04 |
| | | | 29/733 |
| 5,635,785 A | | 6/1997 | Schwanda et al. |
| 8,922,088 B2 | | 12/2014 | Henning et al. |

FOREIGN PATENT DOCUMENTS

| | | |
|---|---|---|
| DE | 1933187 U | 2/1966 |
| DE | 102010020415 A1 | 11/2011 |
| DE | 102013222572 A1 | 5/2015 |
| EP | 0736953 A2 | 10/1996 |

* cited by examiner

US 11,876,422 B2

ROTOR FOR AN ELECTRIC MACHINE

BACKGROUND OF THE INVENTION

Field of the Invention

The present invention relates to a rotor for an electric machine, in particular for a rotor-fed slip ring-rotor machine, as are used for rotational-speed-controllable hydropower motor generators for pumped-storage power plants.

DE 10 2010 020 415 A1 discloses a rotor which is suitable for a rotational-speed-controllable hydropower motor generator. The rotor disclosed in said document comprises winding elements, which are arranged in axially extending slots of a rotor body, a winding head which is arranged axially next to the rotor body, wherein, in the region of the winding head, the winding elements exit the slots in the axial direction, then extend at an angle to the axial direction and then, in the region of their axial ends, extend again in the axial direction and are connected to further winding elements, and a winding head carrier which is arranged radially within the winding head, wherein the winding head is connected to the winding head carrier by way of tie bolts.

It has been shown that, for very quickly rotating machines (>550 revolutions per minute), the strength of the winding head fastening known from DE 10 2010 020 415 A1 is no longer sufficient. However, the application of the present invention is not limited to very quickly rotating machines should an application for some other reasons be envisioned by a person skilled in the art, for example for extending the general service life or for increasing the safety margins during operation.

SUMMARY OF THE INVENTION

The inventors have set themselves the object of specifying a rotor for an electric machine in which the winding head fastening of said rotor has a higher strength than the solution known from the prior art.

The set object is achieved by a rotor for an electric machine as claimed. Advantageous embodiments will result from the dependent claims.

BRIEF DESCRIPTION OF THE SEVERAL VIEWS OF THE DRAWING

The solution according to the invention will be explained below on the basis of figures, with the latter illustrating in detail the following.

DETAILED DESCRIPTION OF THE INVENTION

Figure 1:
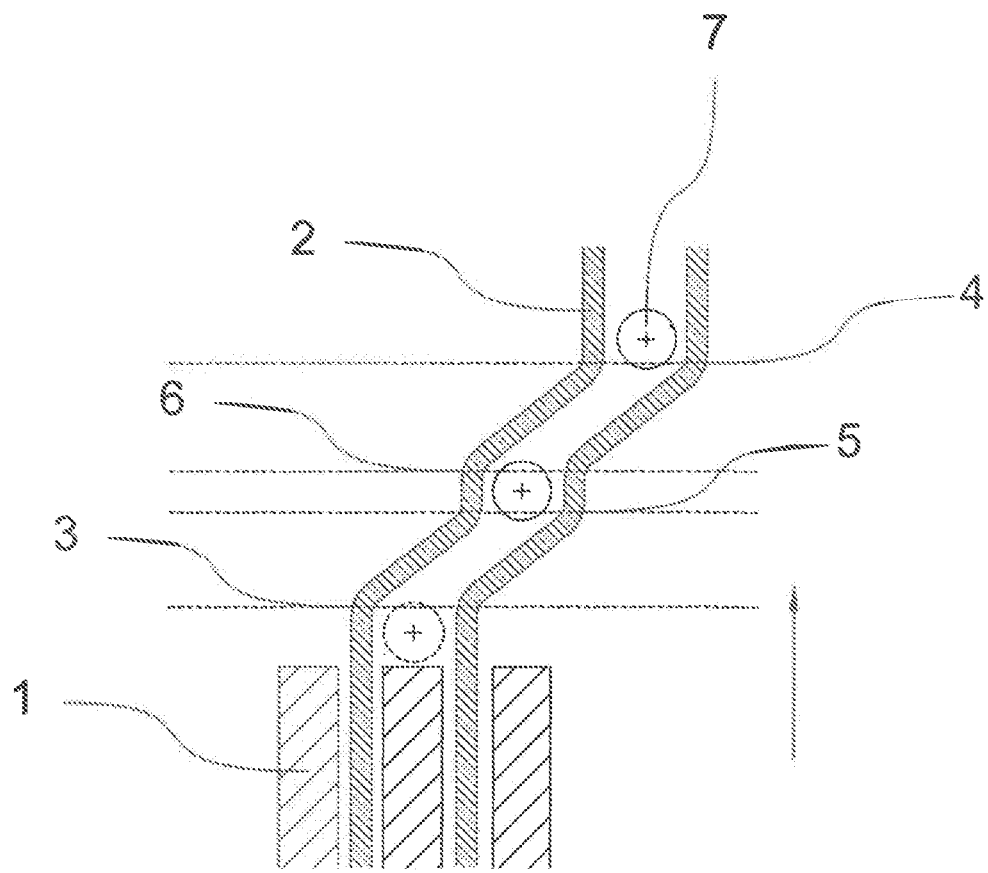
FIG. 1 shows a rotor according to the invention in the region of the winding head.

FIG. 1 show's, in a very schematic illustration, a rotor according to the invention in the region of the winding head. The rotor comprises a rotor body, which is designated by 1. Here, the rotor body 1 is indicated by three hatched rectangles, which represent an identical number of teeth of the rotor body, between which the axially extending slots of the rotor body 1 are arranged. Here, the axial direction of the rotor is indicated by the arrow. The winding head is arranged axially next to the rotor body 1. The rotor comprises a multiplicity of winding elements, of which, in FIG. 1, only two are illustrated, and of which one winding element is designated by 2. It is generally the case that, in a rotor of the type in question, two windings elements 2 are arranged one behind the other in the viewing direction per slot (cf., for example, FIG. 3 of DE 10 2010 020 415 A1 and FIG. 2). For the sake of clarity, FIG. 1 snows only the winding elements 2 situated at the front in the direction of the viewer. In the region of the winding head, the winding elements 2 exit the slots in the axial direction. The ends of the winding elements 2 extend in the axial direction. Each winding element 2 has, in the region of the winding head, a first and a second curvature, wherein the first curvature is designated by 3, and the second curvature is designated by 4. Here, in each case the first curvature 3 is arranged on a first plane perpendicular to the axial direction, and in each case the second curvature 4 is arranged on a second plane perpendicular to the axial direction. Said planes are here indicated by the corresponding horizontal dashed lines. The first plane is situated closer to the rotor body 1 than the second plane. The rotor comprises a multiplicity of tie bolts and a winding head carrier (not illustrated in FIG. 1). The tie bolts connect the winding head to the winding head carrier, wherein the tie bolts penetrate radially through the winding head. Some of the tie bolts are indicated in FIG. 1 by the circles, of which one is designated by 7. Some of the tie bolts 7 are arranged in such a way that the bolt axis thereof is arranged in the axial direction of the rotor between the second plane and the ends of the winding elements 2. The bolt axis is indicated in FIG. 1 in each case by a small cross.

Each winding element 2 further has, in the region of the winding head, a third and a fourth curvature, wherein the third curvature is designated by 5, and the fourth curvature is designated by 6. Here, in each case the third curvature 5 is arranged on a third plane perpendicular to the axial direction, and in each case the fourth curvature 6 is arranged on a fourth plane perpendicular to the axial direction. The third and fourth plane are situated in the axial direction between the first and the second plane, wherein the third plane is situated closer to the first plane than the fourth plane. Some of the tie bolts 7 are arranged in such a way that the bolt axis thereof is arranged in the axial direction of the rotor between the third plane and the fourth plane.

Optionally, some of the tie bolts 7 can be arranged in such a way that the bolt axis thereof is arranged in the axial direction of the rotor between the first plane and the rotor body 1.

In this context, all of the aforementioned range specifications for the position of the bolt axes also include in each case the aforementioned end points insofar as win at is concerned here is the aforementioned planes.

The winding elements 2 extend at an angle to the axial direction between the first and the third plane. The winding elements 2 extend at an angle to the axial direction between the fourth and the second plane. Here, said angles do not necessarily have to be the same size, although this is the case in FIG. 1. The winding elements 2 extend in the axial direction (as shown in FIG. 1) or at an angle to the axial direction between the third and the fourth plane, with this angle in each case being less than the angles at which the winding elements 2 extend between the first and the third plane and between the fourth and the second plane.

Figure 2:
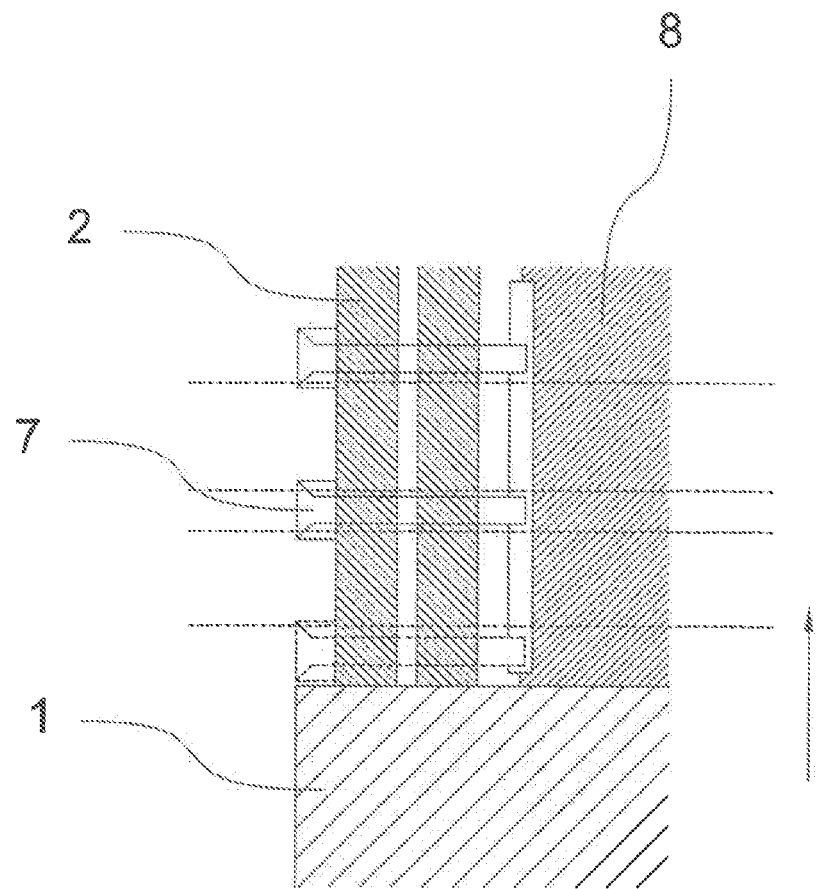
FIG. 2 shows a rotor according to the invention in the region of the winding head, in a side view.

The attachment of the tie bolt 7 to the winding elements 2 and to the winding head carrier can be realized in any manner known from the prior art. FIG. 2 shows one possible embodiment which, with regard to the attachment of the tie bolts 7, follows the technical teaching of DE 10 2010 020 415 A1, which allows very good cooling of the winding elements 2. Here, FIG. 2 snows, in a very schematic illustration, a rotor according to the invention in the region of the winding head in a sectional representation allowing the side view of the winding elements 2. The horizontal dashed lines indicate the planes which extend perpendicular to the axial direction and on which the above-described curvatures of the winding elements 2 are situated. In the side view of FIG. 2, the curvatures themselves cannot be seen. The designations correspond to the designations in FIG. 1. FIG. 2 additionally shows the winding head carrier, which is designated by 8. For details on the attachment of the tie bolts 7 to the winding elements 2 and to the winding head carrier 8, reference may be made to DE 10 2010 020 415 A1.

By comparison with the prior art, the winding elements 2 have, in the region of the winding head, two additional curvatures. That fact alone imparts higher strength to the winding head. The strength can be optionally further increased by an additional third row of tie bolts 7.

The invention claimed is:

1. A rotor for an electric machine, the rotor comprising:
   a rotor body formed with axially extending slots;
   a plurality of winding elements arranged in said axially extending slots of said rotor body; and
   a winding head disposed axially next to said rotor body;
   said winding elements exiting said slots in an axial direction in a region of said winding head, and said winding elements having axial ends extending the axial direction;
   each of said winding elements, in the region of said winding head, having:
      a first curvature arranged on a first plane perpendicular to the axial direction and a second curvature arranged on a second plane perpendicular to the axial direction, with said first plane being situated closer to said rotor body than to said second plane;
      a third curvature arranged on a third plane perpendicular to the axial direction and a fourth curvature arranged on a fourth plane perpendicular to the axial direction, with said third and fourth planes being situated in the axial direction between said first and second planes, and with said third plane being situated closer to said first plane than to said fourth plane;
   a winding head carrier and a multiplicity of tie bolts connecting said winding head to said winding head carrier, with said tie bolts penetrating radially through said winding head;
   some of said tie bolts being arranged with a bolt axis thereof in the axial direction of the rotor between said second plane and said axial ends of said winding elements;
   some of said tie bolts being arranged with the bolt axis thereof in the axial direction of the rotor between said third plane and said fourth plane; and
   said winding elements extending at a first given angle to the axial direction between said first and third planes, and said winding elements extending at a second given angle to the axial direction between said fourth and second planes, and said winding elements extending at a third given angle to the axial direction between said third and fourth planes, wherein the third given angle of said winding elements is less than the first given angle between said first and third planes and the second given angle of said winding elements between said fourth and second planes.

2. The rotor according to claim 1, wherein said winding elements extend in the axial direction between said third and fourth planes.

3. The rotor according to claim 1, wherein some of said tie bolts are arranged with the bolt axis thereof arranged in the axial direction of the rotor between said first plane and said rotor body.

* * * * *